United States Patent [19]
Pierrat

[11] 3,944,821
[45] Mar. 16, 1976

[54] DETECTION OF ANGULAR POSITION

[75] Inventor: Jean Joseph Henri Pierrat, Versailles, France

[73] Assignee: Societe Avions Marcel Dassault -Brequet Aviation, Paris, France

[22] Filed: June 24, 1974

[21] Appl. No.: 482,761

[30] Foreign Application Priority Data
July 4, 1973  France .............................. 73.24563

[52] U.S. Cl. ............ 250/237 G; 250/201; 250/216; 250/236; 356/151; 356/169
[51] Int. Cl.² ......................................... G01B 11/26
[58] Field of Search ........ 250/237 G, 237 R, 231 R, 250/201, 234, 216, 236; 356/169, 151

[56] References Cited
UNITED STATES PATENTS

| | | | |
|---|---|---|---|
| 3,098,186 | 7/1963 | Williamson et al. | 250/237 G |
| 3,153,111 | 10/1964 | Barber et al. | 356/169 |
| 3,198,061 | 8/1965 | Hock | 356/169 |

Primary Examiner—Archie R. Borchelt
Assistant Examiner—E. R. LaRoche
Attorney, Agent, or Firm—Cooper, Dunham, Clark, Griffin & Moran

[57] ABSTRACT

In the measurement of angular position the phenomena of moire or watered configurations produced by a grating on a disc is used.

21 Claims, 9 Drawing Figures

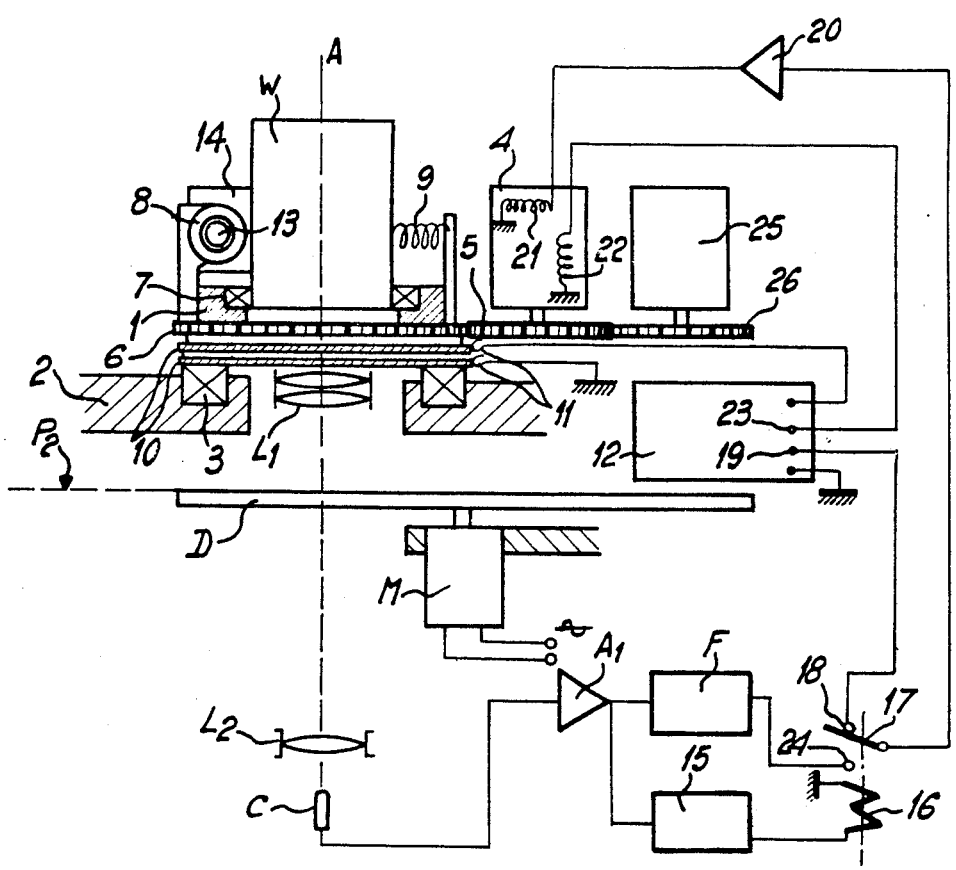

DETECTION OF ANGULAR POSITION

If a grating consisting of parallel alternately transparent and opaque lines, of the kind shown in FIG. 1 of the accompanying drawings, is placed in superjacent relationship with a disc comprising alternately transparent and opaque radial lines, of the kind shown in FIG. 2, moire or watered configurations are produced of the kind which are shown in FIGS. 3 and 4 and which are difficult to describe in words.

If the disc is rotated around its axis at a constant speed relatively to the grating, the light rays passing through the grating-and-disc system experience a modulation whose amplitude passes through a peak in a zone which is disposed on the disc diameter parallel to the grating lines and on the circle marked by an arrow in FIGS. 3 and 4. The position or any movement of the grating parallel to itself has no effect, only grating orientation counting.

This invention uses this property of the grating-and-disc system as a means of detecting an angular position and of providing an angular control based on an optical link between a transmitter and a receiver.

The following description, taken together with the accompanying exemplary non-limitative drawings, will show clearly how the invention can be carried into effect. In the drawings:

FIGS. 1 to 4 show the grating, the disc and the two exemplary watered configurations respectively which have just been referred to;

FIG. 9 is a diagram of an angle control system.

Figure 1:
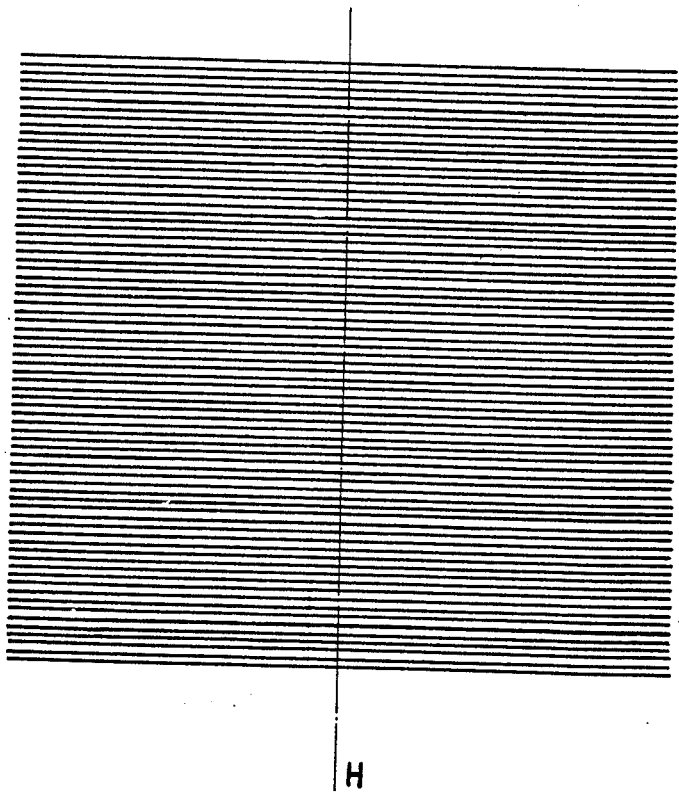
Figure 2:
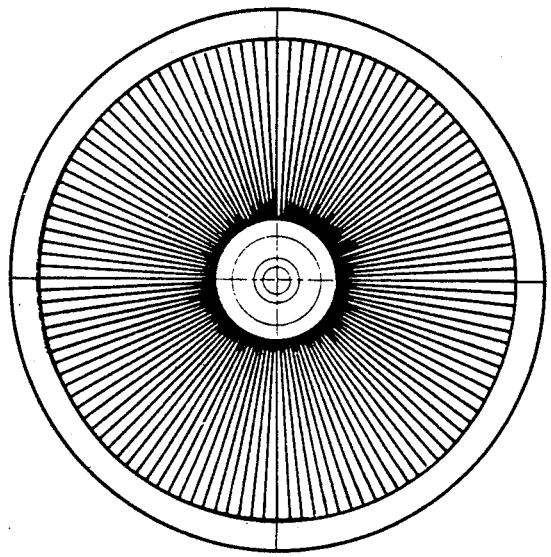
Figure 3:
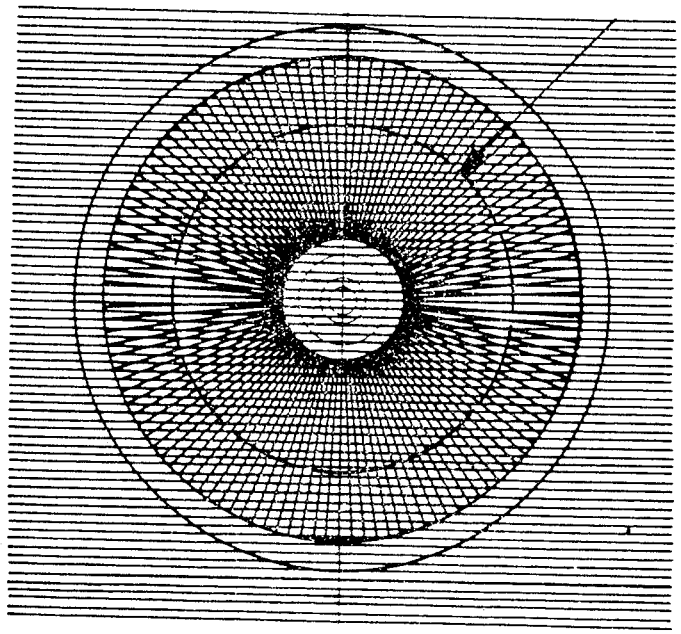
Figure 4:
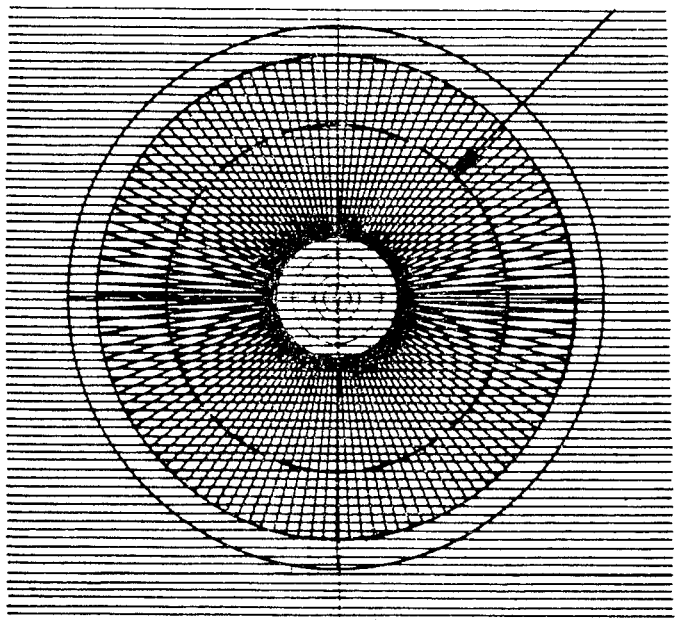
Figure 5:
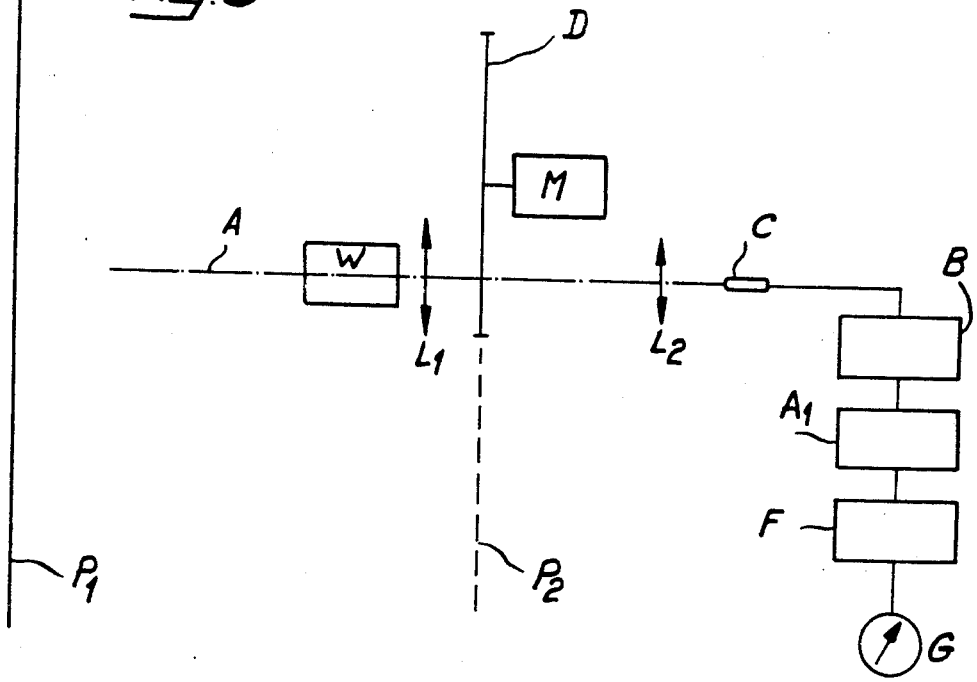
FIG. 5 is a block schematic diagram of a detecting system according to the invention.
Figure 6:
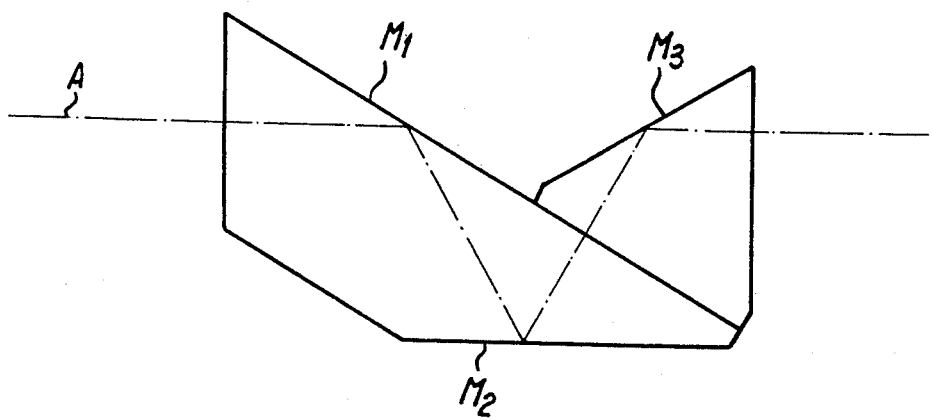
FIG. 6 is a sketch showing a Wollaston prism.

Referring to FIG. 5, a grating similar to the grating of FIG. 1 and whose orientation it is required to detect is disposed in a plane P1. A disc D similar to the disc of FIG. 2 is disposed in a plane P2 parallel to the plane P1 and is rotatable around its axis by a motor M. A lens L1 whose axis is parallel to the disc axis is disposed opposite a place in the disc zone where the watered configurations are most marked, such markedness corresponding substantially to the arrowed circle in FIGS. 3 and 4. Lens L1 forms an image of the grating in the plane P2 — i.e., on the disc D — through a system W which is coaxial of lens L1 and which is so devised that any rotation it makes around its axis causes a rotation through an equal angle of the grating image in the plane P2. The image-rotating system W can be a Wollaston prism such as is shown in FIG. 6 and having three reflecting surfaces M1, M2, M3. Surface M2 is parallel to the prism axis A and surfaces M1, M3 are at an angle of 120° to one another and at angles of 30° to surface M2. The entry and exit surfaces are perpendicular to the axis A. Any rotation of the prism around axis A — which coincides here with the axis of the lens L1 — causes a rotation through the same angle and in the same direction of the grating image in the plane P2. Any other equivalent system could be used.

Disposed on the other side of disc D is a lens L2 which is also coaxial of the lens L1 and which concentrates on a photosensitive cell C the image arising from the superimpositioning of the disc and of the grating image. Cell C is connected to a galvanometer G by way of a power supply unit B, an amplifier A1 and a filter F tuned to the rate-of-passage frequency of the radial lines of disc D.

Figure 7:
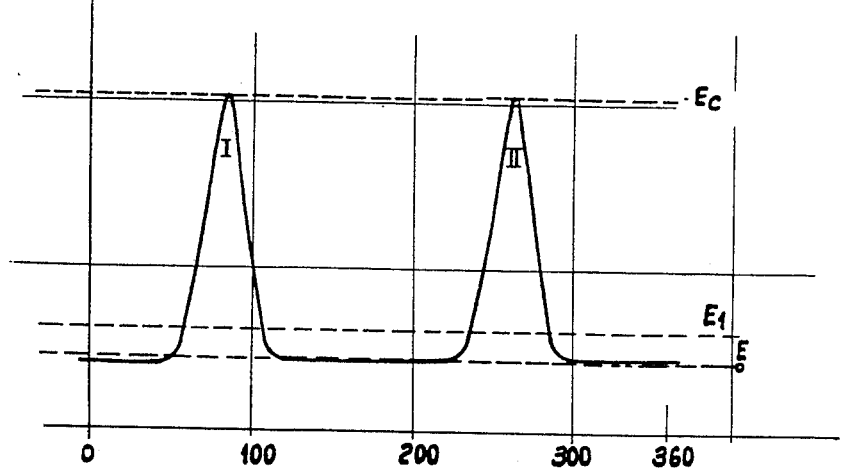
FIG. 7 is a diagram showing the voltage received by the galvanometer of FIG. 7, plotted against the angle of disc rotation.

FIG. 7 shows the characteristic curve linking deflection of the galvanometer G and the angle (expressed in degrees) of prism rotation. The curve has two sharply defined peaks I, II which occur at two 180° — apart positions of the prism and which are a means of detecting the direction of the grating lines accurately. The system W is rotated to give maximum galvanometer deflection. If the original setting of the system W is known, for instance, on a vertical-bar grating, the orientation of the grating in the plane P1 can be deduced. To preclude the possibility of reciprocal error a half-grating can be used derived, for instance, from the grating of FIG. 1 by sectioning along a median line H perpendicular to the bars, the unused half being replaced by a black zone. When the half-grating is correctly positioned relatively to the system, a curve which is of the kind shown in FIG. 8 and which has just a single peak can be obtained.

FIG. 9 shows how, on the basis of a detecting facility of the kind described with reference to FIG. 5, a system can be devised for controlling the position of the image-rotating system W parallel to grating orientation. The grating is disposed in the plane P1 and the disc D is disposed in the plane P2. The image rotator W is disposed on an annular platform 1 mounted on a frame 2 with the interposition of a rolling bearing 3 and adapted to be rotated around its axis by a two-phase control motor 4, a gearwheel 5 and a toothed annulus 6. The system W is disposed on platform 1 with the interposition of a rolling bearing 7 and can be oscillated continuously around its axis A through the agency of a transverse solenoid 8 secured to the platform and of a return spring 9. The solenoid 8 is a.c. energized by way of rings 10, brushes 11 and an oscillator 12 and acts on a core 13 carried by a member 14 rigidly secured to the system W, to which the solenoid 8 imparts, e.g. oscillations of an amplitude of ± 1° and of a frequency of 20 Hz.

The lens L1 forms a sharp image in the plane P2 of disc D of the grating which is disposed in the plane P1. Disc D is driven by motor M at a constant speed corresponding e.g. to a rate-of passage frequency of the radial lines of 10 000 Hz. Lens 12 concentrates the resulting image on the photosensitive cell C.

Figure 8:
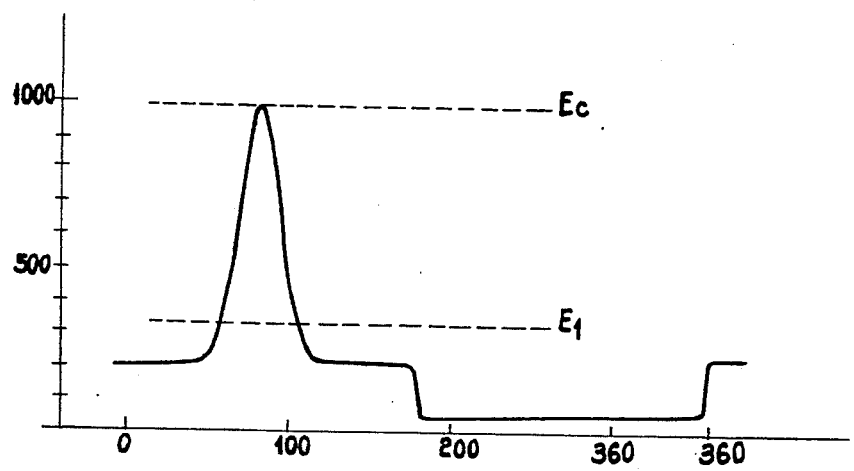
FIG. 8 is a view similar to FIG. 7 but for the voltage in the case of a half-grating.

The same is connected to an amplifier A1 tuned to the last-mentioned frequency and outputting to a filter F tuned to the oscillatory frequency of the system W, the amplifier A1 also outputting to a level detector 15 whose output provides an/off actuation of a relay 16 when the average value of the output from the cell exceeds a value E1 which is somewhere between the residual voltage Eo and the peak voltage Ec which are shown in FIGs. 7 and 8.

Relay contact 17 is normally in contact with a fixed contact 18 connected to terminal 19 of oscillator 12. Contact 17 is connected via an amplifier 20 to energizing winding 21 of motor 4, energizing winding 22 thereof being energized by a voltage in quadrature as a result of being connected to another terminal 23 of oscillator 12. Consequently, platform 1 rotates around its axis at a constant speed while the system W also oscillates around itself at the frequency specified. When because of such rotation the cell is so illuminated that the voltage E1 is reached, relay 16 picks up and contact 17 changes over to terminal 24 so that the signal output by filter F goes to amplifier 20. The latter signal is either cophasal with or in phase opposition to the reference voltage of oscillator 12 and vanishes for positions of the system W corresponding to peaks and troughs of illumination of cell C. If correctly connected, therefore, motor 4 rotates the system W until an accurate stable equilibrium position is reached which corresponds either to one of the peaks I and II of FIG. 7, if a complete grating is used, or to the single peak of FIG. 8.

Depending upon circumstances, the motor 4 can drive various mechanical or electric facilities such as encoders, potentiometers, synchronizers, transducers and so on. FIG. 9 shows by way of example a transmitter 25 driven by a gearwheel 26 meshing with gearwheel 5.

Advantageously, in the case of a grating in the plane P1 which is illuminated by ambient light, the voltage E1 determining the operating threshold of relays 16 can be adjusted by a photoelectric cell which is itself illuminated by ambient light; consequently, should the illumination vary, the voltage E1 represents a substantially constant percentage of the peak voltage Ec.

Accuracy of detection and control depends more particularly upon the pitch or definition of the grating and upon the angular spacing between the radial lines of the disc and can be of the order of 0.1°.

The invention is of use in all cases in which it is required to detect a direction or provide angle control; as possible uses there can be mentioned remote controls, telemetering, machine tool and gyroscope control, use through transparent walls and so on.

Of course, the embodiments hereinbefore described can be modified inter alia by the substitution of equivalent technical means, without for that reason departing from the scope of this invention.

I claim:

1. A device for detecting a direction, comprising a grating having parallel bars orientated in the direction to be detected, a continuously rotating disc having alternately light and dark radii, means for forming an image of the grating on the disc, thereby producing moire figures, means for sensing the average light intensity modulation on the superimposed grating image and disc, and optical means for rotating said grating image around an axis parallel to the axis of disc rotation from a first, initial angular position to a second angular position, at which a peak amplitude is sensed by said light intensity modulation sensing means, said second angular position being indicative of the direction to be detected.

2. A device according to claim 1, wherein said image forming means forms an image of said grating on an eccentric part of said disc.

3. A device according to claim 2, wherein said disc is rotated at a uniform speed.

4. A device according to claim 1, wherein said optical means includes means for oscillating said grating image about its axis of rotation while it is being rotated from said first initial angular position to said second angular position.

5. A device according to claim 4, wherein the frequency of said grating image oscillation is many times less than the frequency of said disc rotation.

6. A device according to claim 5, wherein said sensing means senses the light intensity modulation at a frequency corresponding to the frequency of said grating image oscillation.

7. A device according to claim 1, wherein the optical means for rotating the grating image comprises a rotatable system, which rotates the grating image when said optical system is rotated.

8. A device according to claim 7, wherein the means for sensing the light intensity modulation comprises a photosensitive cell.

9. A device according to claim 8, wherein the disc comprises alternately opaque and light-passing radii, the superimposed grating image and disc being observed by transparency.

10. A device according to claim 9, wherein the photosensitive cell is connected to a measuring instrument through a filter tuned to the rate-of-passage frequency of the disc radii.

11. A device according to claim 8, wherein means are further provided for automatically rotating said optical system from said first initial angular position of the grating image to said second angular position.

12. A device according to claim 11, wherein said means for automatically rotating said optical system from said first to said second angular position comprises an electric motor having a control winding connected to said photosensitive cell.

13. A device according to claim 11, wherein the optical system is oscillated around its axis.

14. A device according to claim 11, wherein said means for automatically rotating said optical system from said first to said second angular position comprises an electric motor having a control winding, a level detector having an input connected to said photosensitive cell and an output, a constant-voltage supply, and switching means responsive to the output of said level detector for selectively connecting said motor control winding to said constant-voltage supply and to said photosensitive cell when respectively the average value of the cell output signal is lower and higher than a predetermined threshold.

15. A device according to claim 14, wherein said switching means comprises a relay having a coil connected to the output of said level detector, a normally closed contact inserted between said constant-voltage supply and said motor control winding, and a normally open contact inserted between said photosensitive cell and motor control winding.

16. A device according to claim 15, wherein the motor is a two-phase motor whose control winding is selectively connectable by the relay to an oscillator and to a filter energized by the cell, the motor energizing winding receiving from the oscillator a voltage in quadrature.

17. A process for detecting a direction, such process comprising the steps of superimposing an image of a parallel bar grating orientated in the direction to be detected on a rotatable disc having alternately light and dark radii, thereby producing moire figures, continuously rotating said disc around its axis, observing the average light intensity modulation on the superimposed grating image and disc, and rotating said grating image around an axis parallel to the disc axis from a first initial angular position to a second angular position, at which a peak amplitude is obtained in the observed light intensity modulation, said second angular position being indicative of the direction to be detected.

18. A process according to claim 17, wherein the grating image is superimposed on an eccentric part of the disc, and said disc is rotated at a uniform speed.

19. A process according to claim 17, wherein said grating image is oscillated about its axis of rotation while it is being rotated from said first initial angular position to said second angular position.

20. A process according to claim 19, wherein the frequency of said grating image oscillation is many times less than the frequency of said disc rotation.

21. A process according to claim 20, wherein the light intensity modulation is observed at a frequency corresponding to the frequency of said grating image oscillation.

* * * * *